United States Patent [19]

Haubennestel et al.

[11] Patent Number: 4,613,641

[45] Date of Patent: Sep. 23, 1986

[54] COATING AND MOLDING COMPOSITIONS WITH SPREADABILITY IMPROVING AND LUBRICITY INCREASING SILOXANES AND USE OF SUCH SILOXANES AS COATING AND MOLDING COMPOSITION ADDITIVES

[75] Inventors: Karlheinz Haubennestel, Wesel; Alfred Bubat, Wesel-Bislich, both of Fed. Rep. of Germany

[73] Assignee: BYK-Chemie GmbH, Wesel, Fed. Rep. of Germany

[21] Appl. No.: 758,354

[22] Filed: Jul. 24, 1985

[30] Foreign Application Priority Data

Jul. 24, 1984 [DE] Fed. Rep. of Germany ....... 3427208

[51] Int. Cl.[4] ................................................ C08K 5/54
[52] U.S. Cl. .................................... 524/267; 524/265; 524/269; 528/15; 528/26; 528/31
[58] Field of Search ................. 524/267, 265, 269; 528/15, 26, 31

[56] References Cited

U.S. PATENT DOCUMENTS 3,203,919  8/1965  Brachman ......................... 524/269
4,020,217  4/1977  Karasudani et al. ................. 524/269

Primary Examiner—Melvyn I. Marquis
Attorney, Agent, or Firm—Schwartz, Jeffery, Schwaab, Mack, Blumenthal & Evans

[57] ABSTRACT

Coating compositions and molding materials containing a polyester group containing siloxane to enhance spreading and increase lubricity, having the formula

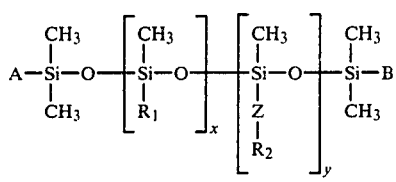

wherein
$R_1$ represents alkyl groups with 1 to 30 carbon atoms which may be replaced partially by other groups,
A and B each represent —$CH_3$ or $R_2$—Z—,
$R_2$ represents an aliphatic and/or cycloaliphatic and/or aromatic polyester group free of Zerewittinoff H atoms, having an average molecular weight of 200 to 3000, and containing at least three

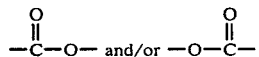

groups,
Z represents a divalent group connecting the silicon atom with the $R_2$ group,
x is 3 to 250,
y is 0 to 50,
and in which the average molecule contains at least one $R_2$—Z— group and the ratio of the number of $R_2$—Z— groups to x is 1:2 to 1:40.

18 Claims, No Drawings

COATING AND MOLDING COMPOSITIONS WITH SPREADABILITY IMPROVING AND LUBRICITY INCREASING SILOXANES AND USE OF SUCH SILOXANES AS COATING AND MOLDING COMPOSITION ADDITIVES

BACKGROUND OF THE INVENTION

The invention relates to coating and molding compositions containing specific siloxanes defined hereinafter to improve spreading and to increase lubricity. The invention also relates to the use of specific siloxanes defined hereinafter to improve the spreadability and increase the lubricity of coating and molding compositions.

It is known to add siloxanes to paints to facilitate spreading and to obtain higher scratch resistance and lubricity. This addition of low molecular weight dimethylpolysiloxanes and methylphenylpolysiloxanes is described in German Pat. Nos. 11 11 320 and 10 92 585. It is further known that polyoxyalkylene modified dimethylpolysiloxanes can be used to obtain similar effects. In this case, the polyoxyalkylene radical serves to improve compatibility in the coating materials (Goldschmidt Informiert, 7/1982, No. 56, p. 2; 6th Fatipec Congress, 1962, p. 332).

However, the known dimethylpolysiloxanes lead in many cases to turbidity in unpigmented coating materials and to poor spreading, which becomes apparent in so-called graining. If the molecular weights of these pure polydimethylsiloxanes are too high, strong disturbances occur in the coating materials, which appear as craters or so-called fisheyes (Wagner/Sarx, Lackkunstharze (1971), p. 166).

The aforementioned polymethylphenylsiloxanes are in most cases highly compatible in coating materials and display good spreadability improving properties, but they are not effective in increasing the scratch resistance.

The aforementioned polyoxyalkylene modified polysiloxanes are highly compatible in many coating compositions, but lead to an undesirable structural configuration, which in roller application of such coating compositions, as is customary in so-called "coil coating", results in a grooved structure. Polyoxyalkylene modified polysiloxanes also are not thermally stable, which particularly becomes clearly apparent at drying temperatures above 150° C. This thermal instability results after the decomposition of the polyoxyalkylene chain in incompatible reaction products and becomes noticeable in a deteriorating intermediate layer adhesion, which may go so far that the second layer may be readily pulled off the first layer. In such a case, the siloxanes act as release agents (Wagner/Sarx, Lackkunstharze (1971), p. 166).

SUMMARY OF THE INVENTION

It is the object of the present invention to use siloxanes to improve the spreadability and increase the lubricity of coating and molding compositions, which do not involve the aforedescribed disadvantages or do so only slightly and, in particular are thermally stable, but on the other hand provide an excellent effect in enhancing spreadability, quieting the surface and increasing scratch resistance.

These and other objects of the invention are achieved by providing coating and molding compositions comprising an effective spreadability improving and lubricity increasing amount of a polyester group containing siloxane corresponding to the formula:

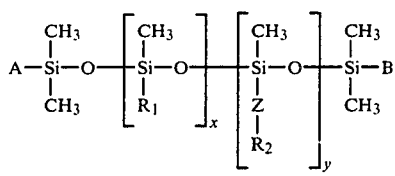

wherein:
$R_1$ represents an alkyl group having 1 to 30 carbon atoms and up to 20 weight percent of the alkyl groups may be replaced by phenyl groups substituted by from 0 to 3 methyl groups or by phenylalkylene groups in which the phenyl group may be substituted by 0 to 3 methyl groups and the alkylene group contains 2 to 3 carbon atoms;
A represents methyl or $R_2$—Z—,
B represents methyl or $R_2$—Z—,
$R_2$ represents an aliphatic and/or cycloaliphatic and/or aromatic polyester group free of Zerewittinoff hydrogen atoms and containing at least three groups selected from

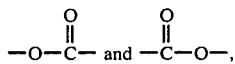

said polyester group having an average molecular weight from about 200 to about 3000,
Z represents a divalent group that connects a silicon atom to an $R_2$ group,
x represents a number from 3 to 250, and
y represents a number from 0 to 50; the molecules of said siloxane contain on the average at least one $R_2$—Z— group and the ratio of the number of $R_2$—Z— groups to x is from 1:2 to 1:40.

In a further aspect of the invention, the objects of the invention are achieved by providing a method for improving the spreadability or increasing the lubricity of a coating composition or a molding composition comprising the step of incorporating into the composition an amount effective to achieve the desired result of a polyester group containing siloxane corresponding to the formula:

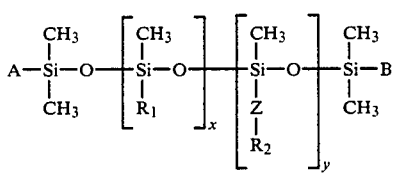

wherein $R_1$, A, B, $R_2$, Z, x and y are as defined above, the molecules of the siloxane contain on the average at least one $R_2$—Z— group, and the ratio of the number of $R_2$—Z— groups to x is 1:2 to 1:40.

DETAILED DESCRIPTION OF PREFERRED EMBODIMENTS

As used herein, the term coating compositions may signify many different products. They may consist of clear lacquers, pigmented paints or paints containing colorants. They may contain binders of highly different types formed with physically or chemically hardening or drying binders.

Examples of physically drying binders include those formed with nitrocellulose, acrylates or methacrylates, chlorinated rubber, mixed PVC polymers, polyvinyl esters, polystyrene, polystyrene copolymers or butadiene copolymers.

Examples of chemically hardening or drying binders include air drying alkyd resins, alkyl-melamine resins, acrylate-melamine resins, acrylate-isocyanate resins (PUR resins), epoxy resins, saturated and unsaturated polyesters, phenol-formaldehyde resins and urea-alkyd resins.

As the liquid phase, these coating compositions may contain organic solvents and/or water or plasticizers, depending on the binder, as is known in this field of art. The liquid phase may also comprise monomers or low molecular weight oligomers which react with the other binder components to form the coatings.

The coating compositions according to the invention may be so-called powder paints, which contain no liquid phase and are applied in the form of powders to the substrate to be coated and are melted and optionally reacted thereon. Powder paints are frequently applied by the so-called electrostatic coating method (see "Coating with Electrostatic Dry Spray", *Plastic Technology*, June 1962, p. 37 to 38.

The coating compositions of the invention thus have fundamentally the same composition as known coating compositions which may contain conventional siloxane additives, and they may contain other customary additive substances. Examples of other additives include cross-linking agents, dispersing agents, fillers, catalysts and/or accelerators for hardening, flowability affecting agents, etc.

Coating compositions are hardened by techniques which depend on the particular binders contained in the coating composition, as is known to those skilled in the art. The siloxanes used according to the invention are especially advantageous in heat hardenable lacquers because the siloxanes used according to the invention are highly temperature resistant, for example under firing conditions at temperatures of up to 250° C. and in the case of relatively short firing times even at temperatures of up to approximately 350° C.

The same is essentially true for molding materials. These materials are defined as masses to be processed into moldings in which the binders contained in the materials are hardened, usually at elevated temperatures, after and/or during the molding process. As used herein, the term "molding materials" particularly includes materials based on unsaturated polyester resins, also in combination with thermoplastic materials such as polystyrene, polyvinylacetate, polymethylmethacrylate and styrene-butadiene copolymers, epoxy resins, polyurethanes, or phenolic resins.

These molding materials may further contain additives customary in the art or other components, such as those mentioned above with respect to coating compositions. In particular, such molding materials may contain fillers and/or reinforcing fillers, such as glass fibers, carbon fibers and polyamide fibers, wollastonite, silicates, inorganic carbonates and aluminum hydroxide.

The amount of the siloxanes to be added to the coating compositions and molding materials is, as in the prior art, sufficient to achieve the desired effect in adequately improving the spreadability and increasing the lubricity. Very small quantities may be sufficient to obtain an appreciable effect, for example 0.005% by weight with respect to the total weight of the coating composition or molding material. Preferably, the amount of siloxane is at least about 0.01% by weight. It is particularly preferred to incorporate amounts of at least about 0.05% by weight, with respect to the total weight of the coating compositions or molding materials. The upper limit of the siloxane content is established by achievement of an adequate effect and the desire to keep the amount as low as possible, as siloxanes are relatively valuable and expensive products, so that for reasons of cost excessive additions are usually avoided. The upper limit generally is around 5% by weight, preferably about 2% by weight, and especially preferably about 1% by weight, with respect to the total weight of the coating compositions or molding materials.

The symbol $R_1$ in Formula I preferably represents alkyl groups with 1 to 30 carbon atoms since the corresponding siloxanes may be prepared from readily accessible starting materials. The selection of alkyl groups depends essentially on the intended application of the siloxanes taking into account the compositions of the coating compositions and molding materials in which they are contained. Siloxanes with long alkyl radicals are wax-like and are especially suitable for powdered coating compositions and molding materials. On the other hand, siloxanes containing lower alkyl groups are liquid or semisolid and are more suitable for liquid coating compositions or molding materials. The physical consistency of the siloxanes is obviously also affected by other parameters of Formula I, particularly the nature of the polyester groups. This will be discussed further hereinafter. It is advantageous to use alkyl groups with up to 18, preferably up to 12 and particularly preferably up to 8 carbon atoms for $R_1$, as these produce a better effect in increasing the lubricity than siloxanes in which the symbol $R_1$ represents alkyl groups with a higher number of carbon atoms. For reasons of easy availability, the methyl group is especially preferred.

Some of the alkyl groups may be replaced by phenyl and/or phenylalkylene groups, which in each case may be substituted by one or more methyl radicals, with the alkylene radicals advantageously containing 2 or 3 carbon atoms. Desirably, the content of phenyl and/or phenylalkylene groups of this type is less than 10% by weight with respect to the total weight of alkyl and phenyl and/or phenylalkylene groups represented by the symbol $R_1$.

The $R_2$ groups are a significant component of the siloxanes used according to the invention. They are polyester groups containing no Zerewittinoff H atoms. They must contain at least three

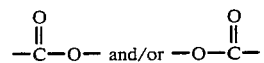

groups. These groups are preferably bonded to each other by divalent hydrocarbon groups with 2 to 12, preferably 4 to 6 carbon atoms. Saturated aliphatic hydrocarbon groups with 5 carbon atoms are especially preferred. The $R_2$ group is preferably a polycaprolactone group formed by polymerization of caprolactone, as described below in detail.

If A and B each represents an $R_2-Z-$ group, it is advantageous that y represent 0. It is thereby also preferred that the ratio of the number of the $R_2-Z-$ groups to the number x is in the range of 1:2 to 1:40, preferably 1:3 to 1:40, most preferably 1:3 to 1:15.

If A and B each represents a CH₃— group, y is advantageously a number between 1 and 50. In this case it is also preferable that the ratio of the number of R₂—Z— groups to the number x lie within the range of 1:10 to 1:20.

The siloxanes containing the polyester groups used according to the invention may be prepared from functional siloxanes, such as those represented by the following Formulae II to X:

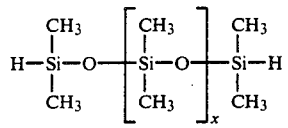

II

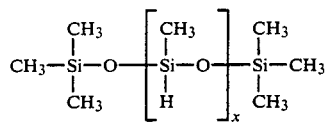

III

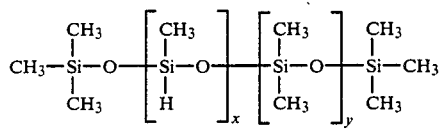

IV

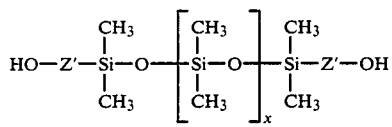

V

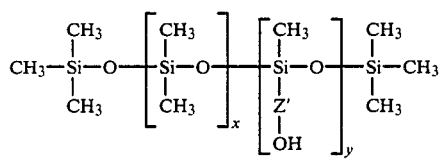

VI

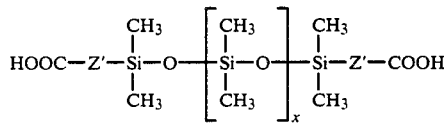

VII

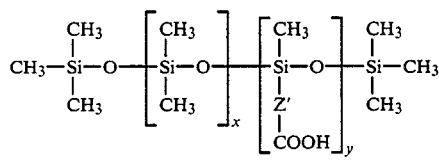

VIII

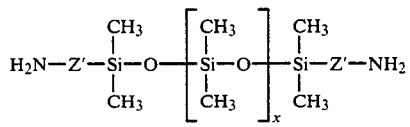

IX

-continued

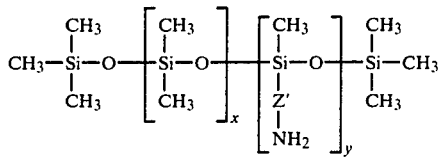

X wherein
x represents a number from 3 to 250,
y represents a number from 0 to 50, and
Z' represents a divalent group bonding a silicon atom to a group selected from OH, COOH and NH₂.

These functional siloxanes may be reacted by either of the subsequently described reaction mechanisms (a) or (b) (Cf. EP-A 0083733):

(a) reaction with monofunctional polyesters, the functional group of which is capable of reacting with the functional groups of siloxanes such as, for example, those indicated by Formulas II to X, or (b) further reaction at the functional groups of one of the siloxanes, for example such as those indicated by the Formulas II to X, by known processes capable of forming polyesters.

With respect to reaction mechanism (a), monofunctional polyesters capable of reacting with such functional siloxanes may contain —OH, —COOH or —CH=CH₂ functions. Examples of OH functional polyesters include those that may be obtained by means of a monohydroxy compound as starting material, for example by polymerization of a lactone, such as propiolactone, valerolactone, caprolactone or their substituted derivatives. Examples of polymerizable lactones may be found in U.S. Pat. No. 4,360,643, which is incorporated herein by reference.

As starting materials, monoalcohols, advantageously with 3 to 30 carbon atoms, preferably 3 to 10 carbon atoms, are used such as n-propanol, n-butanol, long chain saturated alcohols, cyclohexanol and phenylethanol.

If unsaturated alcohols, such as allyl alcohol or 10-decen-1-ol, are used in the lactone polymerization, and if the resulting terminal OH group is closed for example by acylation, alkylation or reacting with monoisocyanates, polyesters with an unsaturated terminal group are obtained.

The lactone polymerization described above is carried out by known processes, initiated, for example, by p-toluenesulfonic acid or dibutyltindilaurate, at temperatures of approximately 100° C. to 180° C. and follows, for example, the following mechanism:

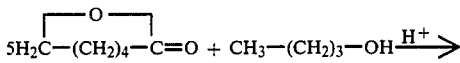

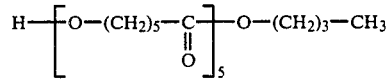

or alternatively by the mechanism:

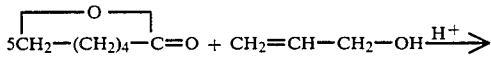

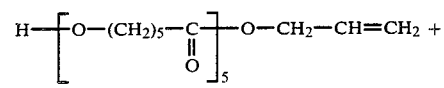

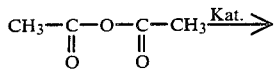

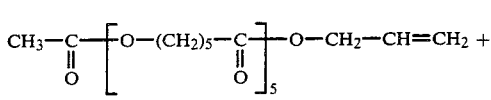

CH₃COOH

These polyesters advantageously have an average molecular weight of approximately 200 to 3000, preferably 500 to 2000.

Such hydroxy- and carboxy-monofunctional polyesters also include those that can be obtained by condensation of a diol, for example ethylene glycol, diethylene glycol, triethylene glycol, propylene glycol, butane diol, hexane diol, neopentyl glycol, dodecane diol and cyclohexanedimethanol and a dibasic acid, such as maleic acid, succinic acid, adipic acid, sebacic acid, phthalic acid, hexahydrophthalic and tetrahydrophthalic acid, in the presence of monohydroxy compounds or monocarboxylic acids. The formation of dihydroxypolyesters may be suppressed by the use of stoichiometric amounts of monohydroxy compounds, as described above. The formation of dicarboxy-functional polyesters is similarly suppressed by the use of monocarboxylic acids in correspondingly stoichiometric proportions. The reaction takes place, for example, by the following mechanism:

CH₃—(CH₂)₅OH + 3HO—(CH₂)₄—OH +

3HOOC—(CH₂)₄—COOH $\xrightarrow{H^+}$

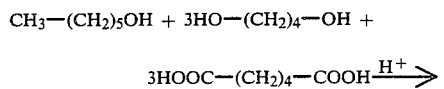

6H₂O or alternatively by the mechanism:

CH₃—(CH₂)₅—COOH + 4HO—(CH₂)₂—OH +

4HOOC—(CH₂)₆—COOH $\xrightarrow{H^+}$

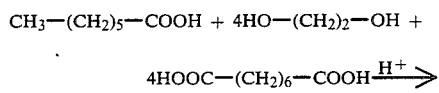

8H₂O

These polyesters advantageously have an average molecular weight of 200 to 2000, preferably 500 to 1500.

These monofunctional polyesters which contain an —OH or —COOH function are reacted by condensation with the corresponding siloxanes in accordance with known processes, with the separation of water or H₂, i.e., for example, hydroxypolyesters with carboxy functional or SiH functional siloxanes or carboxy functional polyesters with hydroxy functional or amino functional siloxanes to form esters or amides.

Terminally unsaturated polyesters are added to SiH functional siloxanes according to known processes by means of, for example, platinum catalysts. The reaction may take place, for example, by the following mechanism:

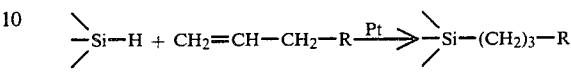

With respect to mechanism (b), a suitable process for forming polyesters is, for example, the ring opening polymerization of lactones. Hereby hydroxyalkyl functional polysiloxanes are directly reacted with lactones, such propiolactone, valerolactone, caprolactone or their substituted derivatives, to form polyesters, and the terminal OH group is acylated, alkylated, silylated or reacted with monoisocyanates.

The lactone polymerization is initiated by known processes, for example by dibutyltindilaurate, and carried out at temperatures of approximately 100° to 180° C., either in suitable solvents, such as high boiling gasoline fractions, alkyl benzenes, esters or ketones, or directly in the melt.

The resulting reaction products contain terminal OH groups, which may not be present in the siloxanes used according to the invention, since these, as mentioned above, may not contain Zerewittinoff H atoms. It is therefore necessary to convert these hydroxyl groups into groups which do not contain Zerewittinoff H atoms. This may be effected by acylation with, for example, acetic anhydride, by alkylation with customary alkylating agents such as benzyl chloride, by conversion to urethanes by means of monoisocyanates such as phenylisocyanate, naphthylisocyanate or butylisocyanate, or by silylation with, for example, hexamethyldisilazane.

The overall reaction takes place, for example, according to the following mechanism:

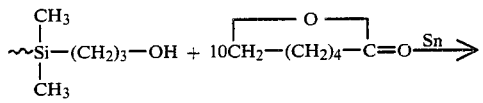

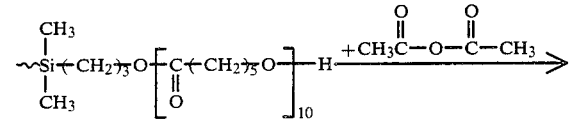

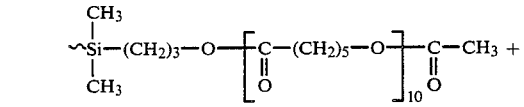

CH₃COOH

The polyesters prepared by this process advantageously may have a molecular weight of approximately 200 to 3000, preferably 500 to 3000. The compounds obtained by caprolactone polymerization in the aforedescribed manner are preferred. As starter siloxanes, α-ω-bishydroxyalkylsiloxanes are preferred. Other processes suitable for forming polyester-containing siloxanes include those which start with hydroxy, carboxy or amino functional polysiloxanes and form polyesters by means of condensation reactions with diols and dicarboxylic acids in the presence of monohydroxy or monocarboxy compounds.

To control the molecular weights and to close the terminal group, the monohydroxy compounds or monocarboxy compounds are used in the corresponding stoichiometric proportions. The reaction takes place, for example, according to the following mechanism:

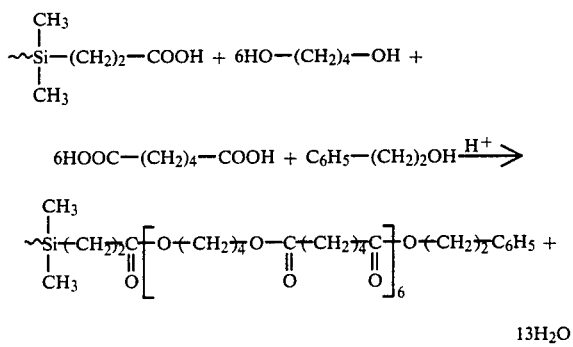

Or, if amino functional siloxanes are used, the reaction takes place, for example, according to the following mechanism:

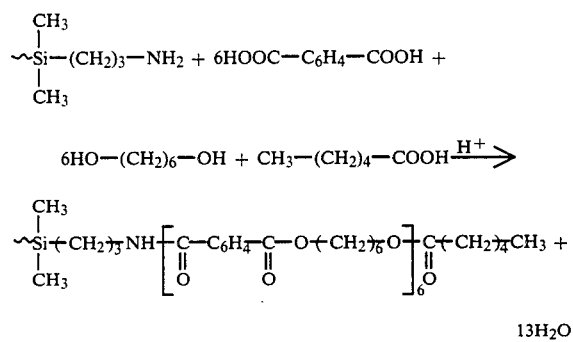

These polyesters may advantageously have an average molecular weight of approximately 200 to 3000, preferably approximately 600 to 1500.

By varying the polyester configuration, such as the choice of the diols, dicarboxylic acids or lactones used, as well as the terminal groups and the number of ester groups, planned compatibility with the polymers used as binders for the coating compositions or molding materials may be obtained. This is particularly important with binders of differing polarity. Also, for example, phthalic acid polyester modified siloxanes may advantageously be used for binders based on phthalic acid polyesters. Caprolactone polyester modified siloxanes are especially preferred because they are compatible with the greatest variety of polymer systems.

It follows from the foregoing that the compounds customarily and preferably used in the art in the field of the lacquer and molding material industry may be employed as the aliphatic, cycloaliphatic and aromatic polyester groups. The aliphatic groups thus may advantageously contain 2 to 12 carbon atoms, whereby for reasons of cost diols having 2 to 4 carbon atoms are preferred, while the dicarboxylic acids advantageously may be those having 2 to 4 carbon atoms in the alkylene chain. The cyclohexane group is preferred as a cycloaliphatic group. The preferred aromatic group is the phenylene group.

The Z group serves to connect the silicon atom to the polyester group $R_2$. The nature of this divalent connecting group depends on the starting materials used in preparation of the siloxanes used according to the invention and the mode of conversion, as known in siloxane chemistry (Cf. inter alia, U.S. Pat. No. 3,960,574, Column 1). Examples of such divalent bonding groups include alkylene groups with 1 to 14, preferably with 1 to 11, and most preferably with 1 to 4 carbon atoms, because the corresponding starting materials are particularly readily available. The divalent groups may also be an oxygen atom or an alkylene group containing a thioether bond (—S—), with 2 to 14, preferably 2 to 11, and most preferably 2 to 4, carbon atoms, such as a —($CH_2$)—$_2$—S—$CH_2$— group. If the composition is based on amino group-containing siloxanes, the bonding group may be an alkylene-amide group, with 2 to 14, preferably 2 to 11, and most preferably 2 to 4, carbon atoms, such as a —($CH_2$)$_3$—NH—CO— group.

If comb-like siloxanes are used, i.e. those in which y is not 0, x should advantageously be less than about 200, preferably less than about 150, and particularly preferably less than about 100. Preferably, x is at least 20. In such comb-like siloxanes the ratio of the number of $R_2$—Z— groups to the number x is preferably 1:10 to 1:20.

If y represents 0, the compounds are so-called linear siloxanes, as the polyester groups are present only at the two ends of the siloxane chain. In this case x represents a number from 4 to 100, preferably 10 to 60.

Formula I represents a mean average formula of a polymer mixture. The groups in brackets within the formula are statistically distributed in the molecule.

When it is required that no Zerewittinoff H atoms should be contained in the polyester groups of the polysiloxanes used according to the invention, this signifies that this requirement is substantially satisfied. In this sense a possible OH number or acid number should be less than 3, advantageously less than 2.

The following examples will make the invention more apparent. The examples and, in particular, the values given in the tables show that products according to the prior art may be superior in one or another test to the compounds used according to the invention. Viewed as an entirety, however, the properties of the compounds used according to the invention are superior to those of the prior art.

EXAMPLE 1

In a reaction vessel equipped with an agitator and a reflux condenser, 643 g (0.5 mole) of a polysiloxane corresponding to the mean average formula:

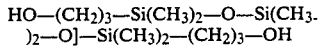

were mixed with 571 g (5 moles) ε-caprolactone and following the addition of 100 ppm dibutyltindilaurate heated under nitrogen to 160° C. After a reaction time of 6 hours, the product was cooled to 60° C. and reacted with 113.4 g (1.1 mole) acetic anhydride and 200 ppm 4-dimethylaminopyridine and agitated for another 30 minutes at 60° C. Subsequently, the acetic acid formed and the remaining excess of acetic anhydride were removed from the reaction product by the application of vacuum (20 mbar).

EXAMPLE 2

An organopolysiloxane was prepared as described in Example 1, using 467 g (0.5 mole) of a polysiloxane corresponding to the mean average formula:

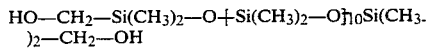

and 457 g (4.0 moles) ε-caprolactame and subsequent acetylation with 113.4 g (1.1 mole) acetic anhydride.

EXAMPLE 3

An organopolysiloxane was prepared in the manner described in Example 1 using 433.3 g (0.25 mole) of a polysiloxane corresponding to the mean average formula of

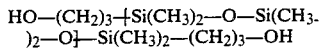

and 856 g (7.5 moles) ε-caprolactone and subsequent acetylation with 61.8 g (0.6 mole) acetic anhydride.

EXAMPLE 4

An organopolysiloxane was prepared in the same manner as in Example 1, using 902 g (0.33 mole) of a polysiloxane corresponding to the mean average formula of

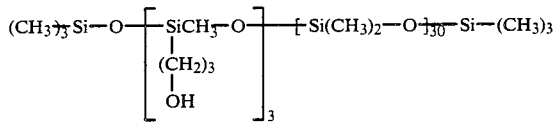

and 685 g (6 moles) ε-caprolactone and subsequent silylation with 64.4 g (0.4 mole) hexamethyldisilazane.

EXAMPLE 5

507 g (0.5 mole) of an unsaturated polyester corresponding to the formula:

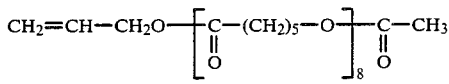

395 g (0.1 mole) of a polysiloxane corresponding to the mean average formula:

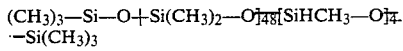

and 225 g of an alkyl benzene (boiling range 165°–185° C.) were mixed under agitation and the passage of nitrogen with 1.2 ml H$_2$PtCl$_6$ (6% solution in isopropanol), heated to 130° C. and maintained at this temperature for 4 hours. After this period of time a sample taken from the reaction mixture no longer showed Si—H bands in its infrared spectrum. By applying a vacuum (20 mbar), the solvent was removed up to a sump temperature of 200° C.

EXAMPLE 6

In accordance with the procedure of Example 5, 864 g (1.1 mole) of an unsaturated polyester corresponding to the formula:

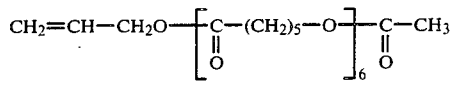

585 g (0.5 mole) of a polysiloxane corresponding to the mean average formula:

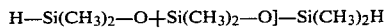

and 362 g alkyl benzene (boiling range 165°–185° C.) were reacted in the presence of hexachloroplatinic(IV) acid.

EXAMPLE 7

101.3 g (0.1 mole) of an unsaturated polyester corresponding to the formula:

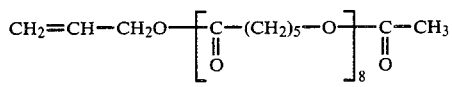

62.7 g of a polysiloxane corresponding to the mean average formula

and 41.3 g xylene were heated with agitation (nitrogen atmosphere) to 70° C. and mixed with 0.15 ml H$_2$PtCl$_6$.6 H$_2$O (6%, in isopropanol) and reacted. After heating to 120° C. and a reaction time of 1 hour, a sample was taken from the reaction mixture and the conversion of —Si—H determined by means of the gas volumetric determination of —Si—H. Subsequently, within 10 minutes first 10.4 g (0.1 mole) styrene and after a post-reaction of 15 minutes, 112 g (1 mole) n-octene-1 were added. A sample taken 30 minutes after the completion of the n-octene-1 addition showed no Si—H bands in the infrared spectrum.

The xylene and the excess n-octene-1 were distilled off under vacuum (20 mbar) up to a sump temperature of 180° C.

EXAMPLE 8

In accordance with the procedure of Example 7, 93.1 g (0.075 mole) of an usaturated polyester corresponding to the formula:

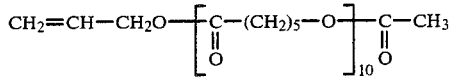

84.2 g (1.0 mole) n-hexene and 62.7 g of a polysiloxane corresponding to the mean average formula:

were reacted in the presence of hexachloroplatinic acid.

EXAMPLE 9

In a reaction vessel equipped with an agitator and a water trap, 791 g (0.5 mole) of a polysiloxane orresponding to the mean average formula:

HO—(CH$_2$)$_3$—[Si(CH$_3$)$_2$—O—Si(CH$_3$)$_2$—O]$_{18}$—Si(CH$_3$)$_2$—(CH$_2$)$_3$—OH were mixed with 438.4 g (3 moles) adipic acid, 180.2 g (2 moles) 1,4-butanediol, and 300 g xylene and heated to approximately 140° C. after the addition of 3 g p-toluenesulfonic acid. After a reaction time of 4 hours (water yield 91 g, theoretical water yield 90 g), 190 g (1.2 mole) decanol were added. After an additional reaction period of 3 hours at approximately 140° C., the resulting product had an acid number of 0.7. Following the application of a vacuum (20 mbar) the xylene and the excess 1-decanol were distilled off up to a sump temperature of 200° C.

EXAMPLE 10

Analagous to Example 9, 495 g (0.5 mole) of a polysiloxane corresponding to the mean average formula:

HO—(CH$_2$)$_3$—Si(CH$_3$)$_2$—O—[Si(CH$_3$)$_2$—O]$_{10}$—Si(CH$_3$)$_2$—(CH$_2$)$_3$—OH were reacted with 296 g (2 moles) phthalic anhydride, 104 g (1 mole) 1,5-pentanediol and 122 g (1.2 mole) 1-hexanol to yield an organopolysiloxane.

EXAMPLE 11

In a manner similar to Example 9, 499 g (0.25 mole) of a polysiloxane corresponding to the mean average formula:

HOOC—CH$_2$S—(CH$_2$)$_2$—Si(CH$_3$)$_2$—O—[Si(CH$_3$)$_2$—O]$_{22}$—Si(CH$_3$)—(CH$_2$)—SCH$_2$COOH were reacted with 225 g (2.5 mole) 1,4-butanediol, 292 g (2 moles) adipic acid and 70 g (0.6 mole) hexanoic acid, to yield an organopolysiloxane.

EXAMPLE 12

In a reaction vessel, equipped with an agitator and a reflux condenser, 642 g (0.5 mole) of a polysiloxane corresponding to the mean average formula:

HO—(CH$_2$)$_3$—Si(CH$_3$)$_2$—O—[Si(CH$_3$)$_2$—O]$_{14}$—Si(CH$_3$)$_2$(CH$_2$)$_3$—OH were mixed with 685 g (6 moles) ε-caprolactone and after the addition of 100 ppm dibutyltindilaurate were heated under nitrogen to 160° C. After a reaction time of 5 hours, the product was cooled to 50° C., the reaction vessel was equipped with a Liebig cooler and 1300 g toluene and 37.8 g (0.7 mole) sodium methylate were added, and methanol was removed from the reaction mixture by distillation. Subsequently, the Liebig cooler was replaced by a reflux condenser supplied with cooling liquid at −40° C. By means of a gas inlet pipe 42.9 g (0.85 mole) methyl chloride were passed through the reaction mixture at 100° C. within a period of 30 minutes, and the mixture was maintained for 5 hours at 100° C.

Subsequently, enough concentrated aqueous HCl was added to render the reaction mixture acidic. After neutralization with sodium bicarbonate the product was filtered and the filtrate freed of volatile components under vacuum (25 mbar) up to a sump temperature of 150° C.

EXAMPLE 13

60.7 g (0.05 mole) of a hydroxy functional polyester corresponding to the formula:

CH$_3$—(CH$_2$)$_3$—O—[C(=O)—(CH$_2$)$_5$—O]$_{10}$—H 62.7 g of a polysiloxane corresponding to the mean average formula:

(CH$_3$)$_3$—Si—O—[SiHCH$_3$—O]$_{60}$—Si(CH$_3$)$_3$ and 120 g xylene were heated with agitation (nitrogen atmosphere) after the addition of 100 ppm zinc acetylacetonate to approx. 125° C. After a reaction time of 2 hours, a sample was taken from the reaction mixture and the —Si—H conversion was determined by gas volumetric determination of —Si—H. Subsequently, within 1 hour 92.6 g (1.1 mole) 1-hexene were added, following the addition of 80 ppm H$_2$PtCl$_6$.6 H$_2$O (6% solution in isopropanol) at 75° C. A sample taken after the completion of the 1-hexene addition showed no more Si—H bands in the infrared spectrum.

The xylene and the excess n-hexene were distilled off in vacuum (20 mbar) up to a sump temperature of 180° C.

EXAMPLE 14

In a reaction vessel equipped with an agitator and a water trap, 716 g (0.5 mole) of a polysiloxane corresponding to the mean average formula:

H$_2$N(CH$_2$)$_3$Si(CH$_3$)$_2$—O—[Si(CH$_3$)$_2$O]$_{6}$—Si(CH$_3$)$_2$(CH$_2$)$_3$NH$_2$ were heated to 160° C. with 146 g (1 mole) adipic acid under a flow of nitrogen. Following the separation of approximately 18 g (1 mole) water and cooling to 95°, 208 g (2 mole) 1,5-pentanediol and 292 g (2 mole) adipic acid were added, and the mixture was reheated to 160° C. After a reaction period of 3 hours, approximately 72 g water (4 mole) had separated, and the reaction mixture was mixed with 190 g (1.2 mole) 1-decanol. Following another reaction period of 3 hours at 160° C., the resulting product had an acid number of 1.1.

By the application of vacuum (20 mbar) the excess decanol was distilled off up to a sump temperature of 200° C.

The polyester modified polysiloxanes described in Examples 1 to 14 were tested in the four practical lacquer systems 1 to 4 described below, whereby it was found that even additions of 0.01% to 1%, preferably 0.10% of these polysiloxanes exhibited the desired effects.

As a comparison, three commercial siloxane polymers 1, 2 and 3 were tested (see Tables 1 to 4).

Polysiloxane 1 = polyoxyalkylenepolysiloxane copolymer = Baysilon OL ®.

Polysiloxane 2 = polymethylphenylsiloxane = Baysilon PL ®

Polysiloxane 3 = low molecular weight polydimethylsiloxane = Baysilon M 50 ®.

As the evaluation criteria, the reduction of sliding resistance, the spreading of the coating surface, subsurface wetting, binder compatibility, foaming behavior and intermediate adhesion were examined at different baking temperatures.

For the measurement of sliding resistance an exact measuring method was used, replacing the "fingernail test" often used in the past or the measurement of the sliding angle of cylindrical bodies on the coating. The test method is described as follows. An electric film drawing (pulling) instrument with a constant advance was used. A tension-compression force transducer was mounted on the film drawing straightedge, which via a measuring amplifier registers on a recorder any resistance opposed to the sliding body. The sliding body is pushed and pulled over the surface to be measured. Weights or hollow cylinders filled with steel balls and provided on their sliding surfaces with a defined felt lining were used as the sliding body.

Measuring Procedure

Following the design of this measuring apparatus, on a defined surface—black, matte synthetic plastic plates, such as those used in the abrasion testing of dispersion paints—measurements were performed with varying slide body weights and stepped (staged) velocities. In testing the different additives, glass plates were used as supports for the coating films.

Results of Measurements

It was found in the comparative measurements that the sliding resistance increases proportionally to the weight of the sliding body. It was determined further that the velocity at which the measuring body is moving over the surface has no measurable effect on the result, even when increased by a factor of 4.

A plot of the measured points in a graph results in a straight line originating at the zero point. Repeated measurements on different surfaces always lead to the same configuration of the curve. The angle of the curve depends on the sliding properties of the surface. This proves that the measuring method produces safely reproduceable results. In practical applications this yields accurate and rapid measurements with objective numerical results. The sliding resistance is given in Newtons (N).

Spreadability tests were visually evaluated with special attention to the so-called "orange peel structure". A strong "orange peel structure" is considered negative; a smooth, homogeneous surface free of craters is considered positive.

Wetting was determined visually and designated positive if complete substrate wetting took place. Results were judged to be negative if there was a partial withdrawal of the wet paint film from the substrate and therefore no homogeneous surface was formed.

Binder compatibility was evaluated visually with 50 μm thick clear lacquer layers (coating composition systems 1 to 4, without pigmentation) applied to glass plates.

Foaming behavior was determined for coatings based on coating composition systems 1, 2 and 4 by visual evaluation of lacquers poured onto aluminum sheets, wherein 100 g lacquer was foamed for 60 seconds at 2000 rpm by means of a dissolver and poured onto aluminum sheets inclined at an angle of 45°.

The evaluation of foaming behavior in coil coating systems (coating composition system 3) is also a significant test criterion, as at high application rates air is worked strongly into the paint by the rapidly moving rollers. These air bubbles become apparent in the finished, hardened layer of the coating in the form of pin holes and defects. A positive evaluation indicates that no such defects were found in the tested lacquer surface.

The testing of intermediate adhesion was effected by means of grid testing on 568 mm × 97 mm × 0.8 mm steel plates, the first 40 μm thick lacquer layer of which was baked on in a gradient furnace. The gradient furnace (manufactured by BYK Chemie GmbH) is a testing apparatus for determining baking and drying behavior of lacquers, resins, synthetic materials, powder coatings, and the like. Baking is effected on a heat bench the temperature range of which is selectable.

In the process, baking is performed on a single plate with a constant baking time and different temperatures.

The second 40 m thick lacquer layer was hardened in a circulating air oven at the customary baking temperature of each coating composition system.

| Coating Composition Test Systems (Ingredient proportions in weight percent) | |
|---|---|
| 1. Two-Component Automobile Repair Lacquer: | |
| Hydroxyacrylate binder (Macrynal ® SM 510 N), 60% | 44.28 |
| Dibutyltindilaurate | 0.19 |
| Diethylethanolamine | 0.26 |
| Butyl acetate | 4.49 |
| Xylene | 4.49 |
| Ethylglycolacetate | 3.39 |
| Aromatic hydrocarbon, boiling range 165–185° C. | 3.90 |
| ZiO$_2$ (2160 Bayer Co.) | 23.17 |
| Hardener (Desmodur ® N/Bayer Co.) | 15.83 |
| 2. Acrylic/Melamine lacquer: | |
| Acrylic resin (Synthacryl ® SC 303/Hoechst) | 43.4 |
| Melamine resin (Setamine ® US 133/Synthese Co.) | 15.5 |
| Pigment (Sicomin red ® L 3030 S/BASF) | 25.0 |
| Bentonite paste, 10% | 2.5 |
| Xylene | 4.6 |
| Aromatic hydrocarbon, boiling range 165–185° C. | 6.0 |
| Aromatic hydrocarbon, boiling range 186–215° C. | 3.0 |
| 3. Coil Coating Lacquer: | |
| Oil-free polyester (Uralac ® 107-RA 8, Scado Co.) | 44.55 |
| TiO$_2$ (RN 59/Bayer Co.) | 20.35 |
| Melamine resin (Cymel ® 301/American Cyanamid Co.) | 4.70 |
| p-toluenesulfonic acid, 40%, in ethyleneglycol acetate | 0.25 |
| Dilutant | 30.15 |
| 4. Acrylate Resin Lacquer (self crosslinking): | |
| Acrylate resin (Lardodur ® 150 BX/BASF) | 51.03 |
| TiO$_2$ (R-KB 2/Bayer Co.) | 29.63 |
| Bentonite paste, 10% | 1.70 |
| Xylene | 13.72 |
| n-butanol | 3.92 |

Evaluation Criteria:

Intermediate adhesion
1 = good adhesion, no spalling
2 = slight spalling
3 = medium spalling
4 = no adhesion Spreadability/wetting
1 = very good spreading/wetting
2 = good spreading/wetting
3 = poor spreading/wetting Turbidity in the lacquer film
1 = no turbidity
2 = very light turbidity
3 = light turbidity
4 = strong turbidity Foam
1 = defoaming
2 = as the blank test (indifferent)
3 = foam stabilizing

TABLE 1

Testing of a Two-Component Automobile Repair Lacquer

| Product | Amount of Active Ingredient Used (%) | Sliding Resistance N | Spreading | Turbidity | Foam | Intermediate Adhesion (°C.) | | | |
|---|---|---|---|---|---|---|---|---|---|
| | | | | | | 60 | 80 | 100 | 120 |
| Blank Test | (no additive) | 3,14 | 3 | 1 | 2 | 1 | 1 | 1 | 2 |
| Polysiloxane 1 | 0,1 | 0,83 | 1-2 | 1 | 3 | 1 | 1 | 2 | 4 |
| Polysiloxane 2 | 0,1 | 3,05 | 1 | 1 | 2 | 1 | 1 | 1 | 2 |
| Polysiloxane 3 | 0,1 | 1,18 | 2 | 3 | 1 | 1 | 1 | 2 | 3 |
| Example 1 | 0,1 | 0,79 | 1 | 1 | 2 | 1 | 1 | 1 | 1 |
| Example 2 | 0,1 | 0,80 | 1 | 1 | 2 | 1 | 1 | 1 | 1 |
| Example 3 | 0,1 | 0,95 | 1 | 1 | 2 | 1 | 1 | 1 | 2 |
| Example 4 | 0,1 | 0,78 | 1-2 | 1 | 2 | 1 | 1 | 1 | 2 |
| Example 5 | 0,1 | 0,84 | 1 | 1 | 2 | 1 | 1 | 1 | 1 |
| Example 6 | 0,1 | 0,89 | 1 | 1 | 2 | 1 | 1 | 1 | 1 |
| Example 7 | 0,1 | 0,98 | 1-2 | 2 | 1 | 1 | 1 | 2 | 2 |
| Example 8 | 0,1 | 0,85 | 1-2 | 2 | 1 | 1 | 1 | 2 | 2 |
| Example 9 | 0,1 | 0,76 | 1 | 1 | 2 | 1 | 1 | 1 | 1 |
| Example 10 | 0,1 | 0,83 | 1 | 1 | 2 | 1 | 1 | 1 | 1 |
| Example 11 | 0,1 | 0,76 | 1 | 1 | 2 | 1 | 1 | 1 | 2 |
| Example 12 | 0,1 | 0,81 | 1-2 | 1 | 2 | 1 | 1 | 1 | 1 |
| Example 13 | 0,1 | 0,90 | 1 | 2 | 1 | 1 | 1 | 2 | 2 |
| Example 14 | 0,1 | 0,92 | 1-2 | 1 | 2 | 1 | 1 | 1 | 2 |

TABLE 2

Acryl/Melamine Lacquer

| Product | Amount of Active Ingredient Used (%) | Sliding Resistance N | Spreading | Turbidity | Foam | Intermediate Adhesion (°C.) | | | |
|---|---|---|---|---|---|---|---|---|---|
| | | | | | | 130 | 150 | 170 | 190 |
| Blank Test | (no additive) | 2,94 | 3 | 1 | 2 | 1 | 1 | 2 | 3 |
| Polysiloxane 1 | 0,1 | 1,18 | 1 | 1 | 3 | 1 | 2 | 3 | 4 |
| Polysiloxane 2 | 0,1 | 2,90 | 1 | 2 | 2 | 1 | 1 | 2 | 2 |
| Polysiloxane 3 | 0,1 | 1,62 | 1-2 | 4 | 1 | 1 | 2 | 3 | 3 |
| Example 1 | 0,1 | 0,83 | 1 | 1 | 2 | 1 | 1 | 1 | 1 |
| Example 2 | 0,1 | 0,87 | 1 | 1 | 2 | 1 | 1 | 1 | 2 |
| Example 3 | 0,1 | 0,92 | 1 | 1 | 2 | 1 | 1 | 1 | 2 |
| Example 4 | 0,1 | 0,75 | 1 | 1 | 2 | 1 | 1 | 1 | 1 |
| Example 5 | 0,1 | 0,97 | 1 | 1 | 2 | 1 | 1 | 1 | 2 |
| Example 6 | 0,1 | 0,91 | 1 | 1 | 2 | 1 | 1 | 1 | 2 |
| Example 7 | 0,1 | 0,98 | 1 | 2 | 1 | 1 | 1 | 2 | 3 |
| Example 8 | 0,1 | 0,96 | 1 | 2 | 1 | 1 | 1 | 2 | 3 |
| Example 9 | 0,1 | 0,89 | 1 | 1 | 2 | 1 | 1 | 1 | 1 |
| Example 10 | 0,1 | 0,84 | 1 | 1 | 2 | 1 | 1 | 1 | 2 |
| Example 11 | 0,1 | 0,80 | 1 | 1 | 2 | 1 | 1 | 1 | 2 |
| Example 12 | 0,1 | 0,95 | 1 | 1 | 2 | 1 | 1 | 1 | 1 |
| Example 13 | 0,1 | 1,05 | 1 | 2 | 1 | 1 | 2 | 2 | 3 |
| Example 14 | 0,1 | 0,93 | 1 | 1-2 | 1 | 1 | 1 | 2 | 2 |

TABLE 3

Coil Coating Lacquer Test

| Product | Amount of Active Ingredient Used (%) | Sliding Resistance N | Spreading | Wetting | Turbidity | Foam | Intermediate Adhesion (°C.) | | | |
|---|---|---|---|---|---|---|---|---|---|---|
| | | | | | | | 190 | 210 | 230 | 250 |
| Blank Test | (no additive) | 2,80 | 3 | 3 | 1 | 2 | 1 | 1 | 1 | 1 |
| Polysiloxane 1 | 0,1 | 0,81 | 1-2 | 1-2 | 1 | 3 | 2 | 2 | 3 | 4 |
| Polysiloxane 2 | 0,1 | 2,79 | 3 | 3 | 2 | 2 | 1 | 1 | 1 | 2 |
| Polysiloxane 3 | 0,1 | 1,20 | 1-2 | 2-3 | 4 | 1 | 1 | 1 | 2 | 2 |
| Example 1 | 0,1 | 0,49 | 1 | 1 | 1 | 2 | 1 | 1 | 1 | 1 |
| Example 2 | 0,1 | 0,55 | 1 | 1 | 1 | 2 | 1 | 1 | 1 | 1 |
| Example 3 | 0,1 | 0,57 | 1 | 1 | 1 | 2 | 1 | 1 | 1 | 1 |
| Example 4 | 0,1 | 0,63 | 1 | 1 | 1 | 2 | 1 | 1 | 1 | 1 |
| Example 5 | 0,1 | 0,68 | 1 | 1 | 1 | 2 | 1 | 1 | 1 | 1 |
| Example 6 | 0,1 | 0,62 | 1 | 1 | 1 | 2 | 1 | 1 | 1 | 1 |
| Example 7 | 0,1 | 0,70 | 1 | 1-2 | 2 | 1 | 1 | 1 | 2 | 2 |
| Example 8 | 0,1 | 0,73 | 1 | 1-2 | 2 | 1 | 1 | 1 | 2 | 2 |
| Example 9 | 0,1 | 0,70 | 1 | 1 | 1 | 2 | 1 | 1 | 1 | 1 |
| Example 10 | 0,1 | 0,67 | 1 | 1 | 1 | 2 | 1 | 1 | 1 | 1 |
| Example 11 | 0,1 | 0,67 | 1 | 1 | 1 | 2 | 1 | 1 | 1 | 1 |
| Example 12 | 0,1 | 0,71 | 1 | 1 | 1 | 2 | 1 | 1 | 1 | 1 |
| Example 13 | 0,1 | 0,81 | 1 | 1-2 | 2 | 1 | 1 | 1 | 2 | 2 |
| Example 14 | 0,1 | 0,83 | 1 | 1 | 1 | 2 | 1 | 1 | 1 | 1 |

TABLE 4

| | Acrylate Resin Lacquer Test | | | | | | | | |
|---|---|---|---|---|---|---|---|---|---|
| | Amount of Active Ingredient Used | Sliding Resistance | | | | Intermediate Adhesion (°C.) | | | |
| Product | (%) | N | Spreading | Turbidity | Foam | 130 | 150 | 170 | 190 |
| Blank Test | (no additive) | 3,67 | 2 | 1 | 2 | 1 | 1 | 2 | 2 |
| Polysiloxane 1 | 0,1 | 0,78 | 1 | 1 | 3 | 1 | 2 | 4 | 4 |
| Polysiloxane 2 | 0,1 | 3,45 | 2 | 1 | 2 | 1 | 2 | 3 | 3 |
| Polysiloxane 3 | 0,1 | 1,76 | 1 | 4 | 1 | 1 | 3 | 3 | 3 |
| Example 1 | 0,1 | 0,71 | 1 | 1 | 2 | 1 | 1 | 1 | 1 |
| Example 2 | 0,1 | 0,69 | 1 | 1 | 2 | 1 | 1 | 1 | 1–2 |
| Example 3 | 0,1 | 0,70 | 1 | 1 | 2 | 1 | 1 | 1–2 | 1–2 |
| Example 4 | 0,1 | 0,73 | 1 | 1 | 2 | 1 | 1 | 1 | 1 |
| Example 5 | 0,1 | 0,78 | 1 | 1 | 2 | 1 | 1 | 1–2 | 2 |
| Example 6 | 0,1 | 0,70 | 1 | 1 | 2 | 1 | 1 | 1 | 2 |
| Example 7 | 0,1 | 0,88 | 1 | 2 | 1 | 1 | 2 | 2 | 2–3 |
| Example 8 | 0,1 | 0,86 | 1 | 2 | 1 | 1 | 2 | 2 | 2–3 |
| Example 9 | 0,1 | 0,77 | 1 | 1 | 2 | 1 | 1 | 1 | 2 |
| Example 10 | 0,1 | 0,71 | 1 | 1 | 2 | 1 | 1 | 1 | 2 |
| Example 11 | 0,1 | 0,80 | 1 | 1 | 2 | 1 | 1 | 1 | 1–2 |
| Example 12 | 0,1 | 0,76 | 1 | 1 | 2 | 1 | 1 | 1 | 2 |
| Example 13 | 0,1 | 0,76 | 1 | 2 | 1 | 1 | 2 | 2 | 2–3 |
| Example 14 | 0,1 | 0,85 | 1 | 1 | 2 | 1 | 1 | 2 | 2 |

The foregoing description has been set forth merely to illustrate the invention and is not intended to be limiting. Since modifications of the described embodiments incorporating the spirit and substance of the invention may occur to persons skilled in the art, the scope of the invention is to be limited solely with respect to the appended claims and equivalents.

We claim:

1. A composition of matter selected from the group consisting of coating compositions and molding compositions further comprising an effective spreadability enhancing and lubricity improving amount of a polyester group containing siloxane corresponding to the formula

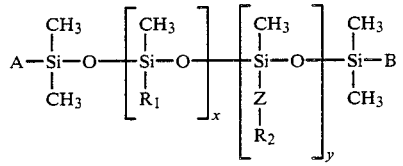

wherein:

$R_1$ represensts an alkyl group having 1 to 30 carbon atoms and up to 20 weight percent of the alkyl groups may be replaced by phenyl groups substituted by from 0 to 3 methyl groups or by phenylalkylene groups in which the phenyl group may be substituted by 0 to 3 methyl groups and the alkylene group contains 2 to 3 carbon atoms;

A represents methyl or $R_2$—Z—,

B represents methyl or $R_2$—Z—, $R_2$ represents an aliphatic, cycloaliphatic or aromatic polyester group free of Zerewittinoff hydrogen atoms and containing at least three

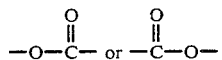

groups, said polyester group having an average molecular weight from about 200 to about 3000, Z represents a divalent group that connects a silicon atom to an $R_2$ group, x represents a number from 3 to 250, and y represents a number from 0 to 50; the molecules of said siloxane contain on the average at least one $R_2$—Z— group, and the ratio of the number of $R_2$—Z— groups to x is from 1:2 to 1:40.

2. A composition according to claim 1, wherein $R_1$ represents an alkyl group with 1 to 18 carbon atoms.

3. A composition according to claim 1, wherein $R_1$ represents an alkyl group with 1 to 12 carbon atoms.

4. A composition according to claim 1, wherein $R_1$ represents an alkyl group with 1 to 8 carbon atoms.

5. A composition according to claim 1, wherein $R_1$ represents a methyl group.

6. A composition according to claim 1, wherein the

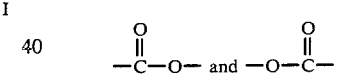

groups in the $R_2$ groups are connected together by divalent hydrocarbon groups with 2 to 12 carbon atoms.

7. A composition according to claim 6, wherein the

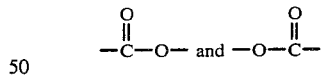

groups in the $R_2$ groups are connected together by divalent hydrocarbon groups with 4 to 6 carbon atoms.

8. A composition according to claim 7, wherein the

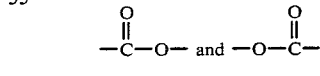

groups in the $R_2$ groups are connected together by saturated aliphatic hydrocarbon groups with 5 carbon atoms.

9. A composition according to claim 1, wherein $R_2$ is a polycaprolactone group.

10. A composition according to claim 1, wherein A and B each represent an $R_2$—Z— group, and y is 0.

11. A composition according to claim 10, wherein the ratio of the number of $R_2$—Z— groups to x is within the range from 1:3 to 1:40.

12. A composition according to claim 11, wherein the ratio of the number of $R_2$—Z— groups to x is within the range from 1:3 to 1:15.

13. A composition according to claim 1, wherein A and B each represent a $CH_3$— group and y is a number from 1 to 50.

14. A composition according to claim 13, wherein the ratio of the number of $R_2$—Z— groups to x is within the range from 1:10 to 1:20.

15. A composition according to claim 1, wherein Z represents a divalent group selected from the group consisting of alkylene groups with 1 to 14 carbon atoms, an oxygen atom, alkylene thioether groups with 2 to 14 carbon atoms, and aklylene amide groups with 2 to 14 carbon atoms.

16. A composition according to claim 15, wherein Z represents a divalent group selected from the group consisting of alkylene groups with 1 to 11 carbon atoms, an oxygen atom, alkylene thioether groups with 2 to 11 carbon atoms, and alkylene amide groups with 2 to 11 carbon atoms.

17. A composition according to claim 16, wherein Z represents a divalent group selected from the group consisting of alkylene groups with 1 to 4 carbon atoms, an oxygen atom, alkylene thioether groups with 2 to 4 carbon atoms, and alkylene amide groups with 2 to 4 carbon atoms.

18. A method of improving the spreadability and increasing the lubricity of a composition selected from the group consisting of coating compositions and molding compositions comprising adding to said composition an effective spreadability increasing and lubricity improving amount of a polyester group containing siloxane corresponding to the formula:

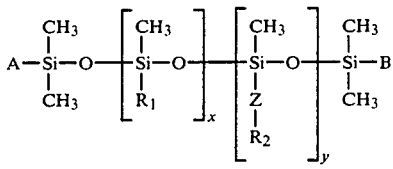

wherein:
$R_1$ represents an alkyl group having 1 to 30 carbon atoms and up to 20 weight percent of the alkyl groups may be replaced by phenyl groups substituted by from 0 to 3 methyl groups or by phenylalkylene groups in which the phenyl group may be substituted by 0 to 3 methyl groups and the alkylene group contains 2 to 3 carbon atoms;

A represents methyl or $R_2$—Z—,

B represents methyl or $R_2$—Z—, $R_2$ represents an aliphatic, cycloaliphatic or aromatic polyester group free of Zerewittinoff hydrogen atoms and containing at least three

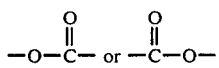

groups, said polyester group having an average molecular weight from about 200 to about 3000, Z represents a divalent group that connects a silicon atom to an $R_2$ group, x represents a number from 3 to 250, and y represents a number from 0 to 50; the molecules of said siloxane contain on the average at least one $R_2$—Z— group, and the ratio of the number of $R_2$—Z— groups to x is from 1:2 to 1:40.

* * * * *